United States Patent [19]

Steudler, Jr.

[11] Patent Number: 4,610,221

[45] Date of Patent: Sep. 9, 1986

[54] NIPPLE FOR FEEDING LIQUIDS TO FOWL AND/OR SMALL ANIMALS

[75] Inventor: Frederick W. Steudler, Jr., New Providence, Pa.

[73] Assignee: Val Products, Inc., Bird-in-Hand, Pa.

[21] Appl. No.: 747,574

[22] Filed: Jun. 24, 1985

Related U.S. Application Data

[63] Continuation of Ser. No. 595,577, Apr. 2, 1984, Pat. No. 4,524,724.

[51] Int. Cl.$^4$ .......................... A01K 7/06; F16K 1/44
[52] U.S. Cl. .................................... 119/72.5; 251/333
[58] Field of Search ................. 119/72.5; 251/333, 339

[56] References Cited

U.S. PATENT DOCUMENTS

| | | | |
|---|---|---|---|
| 2,851,007 | 9/1958 | Kagan | 119/72.5 |
| 2,902,250 | 9/1959 | Bering | 251/333 X |
| 3,077,896 | 2/1963 | Weingard | 251/333 X |
| 3,510,103 | 5/1970 | Carsello | 251/333 |
| 4,284,036 | 8/1981 | Hostetler | 119/72.5 |
| 4,524,724 | 6/1985 | Steudler, Jr. | 119/72.5 |

Primary Examiner—Robert P. Swiatek
Attorney, Agent, or Firm—Diller, Ramik & Wight

[57] ABSTRACT

This disclosure is directed to a nipple particularly adapted for feeding liquid to fowl and/or small animals, the nipple including a housing in which is press-fit a relatively thick walled machined metallic insert defining a passage through which liquid is adapted to pass from an upstream portion to a downstream portion thereof, a valve in the passage defined by a pair of peripheral valve seats and a metallic spherical ball normally resting upon the peripheral valve seats, the first peripheral valve seat is upstream from the second peripheral valve seat and has a diameter less than the diameter of the spherical ball but greater than the diameter of the second peripheral valve seat, a stem defined by a head and a pin, the stem having a concave surface within which is fully seated the spherical ball, and a surface of the insert upstream from the first peripheral valve seat being operative for both centering the metallic ball relative to both the first and second peripheral valve seats and for preventing the establishment of high impact closing forces between the metallic ball and the second peripheral valve seat thereby assuring repetitive formation of two peripheral seals absent damage to the metallic ball.

1 Claim, 8 Drawing Figures

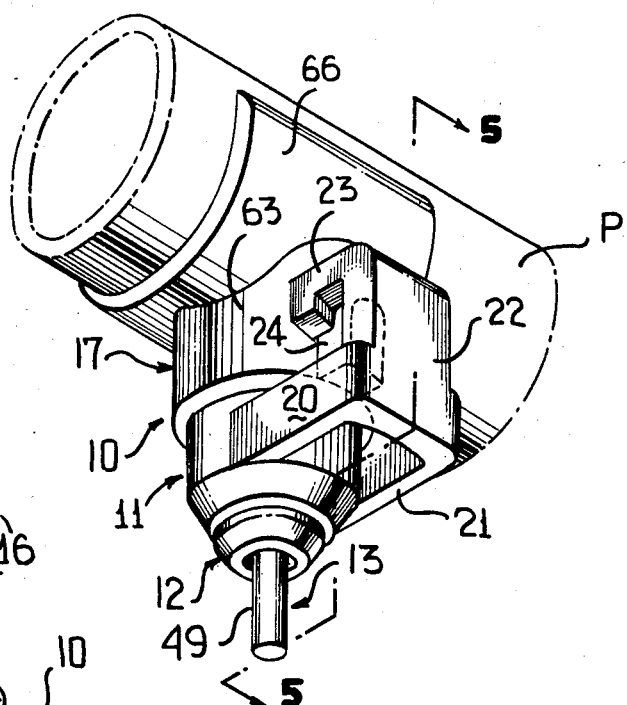
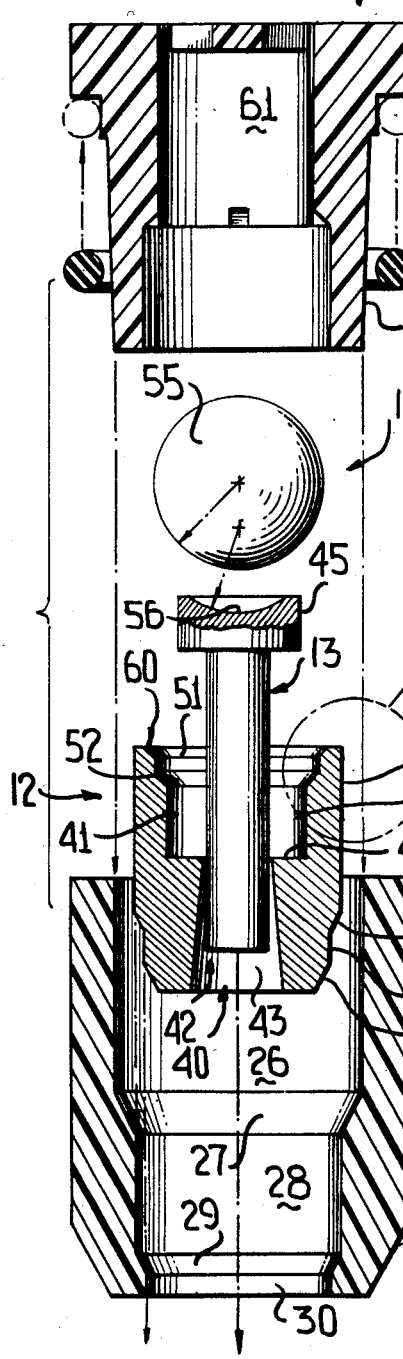
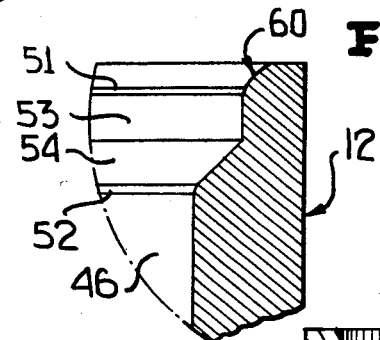
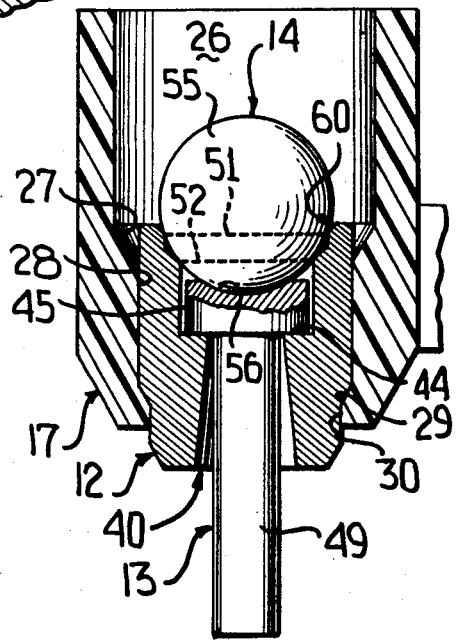

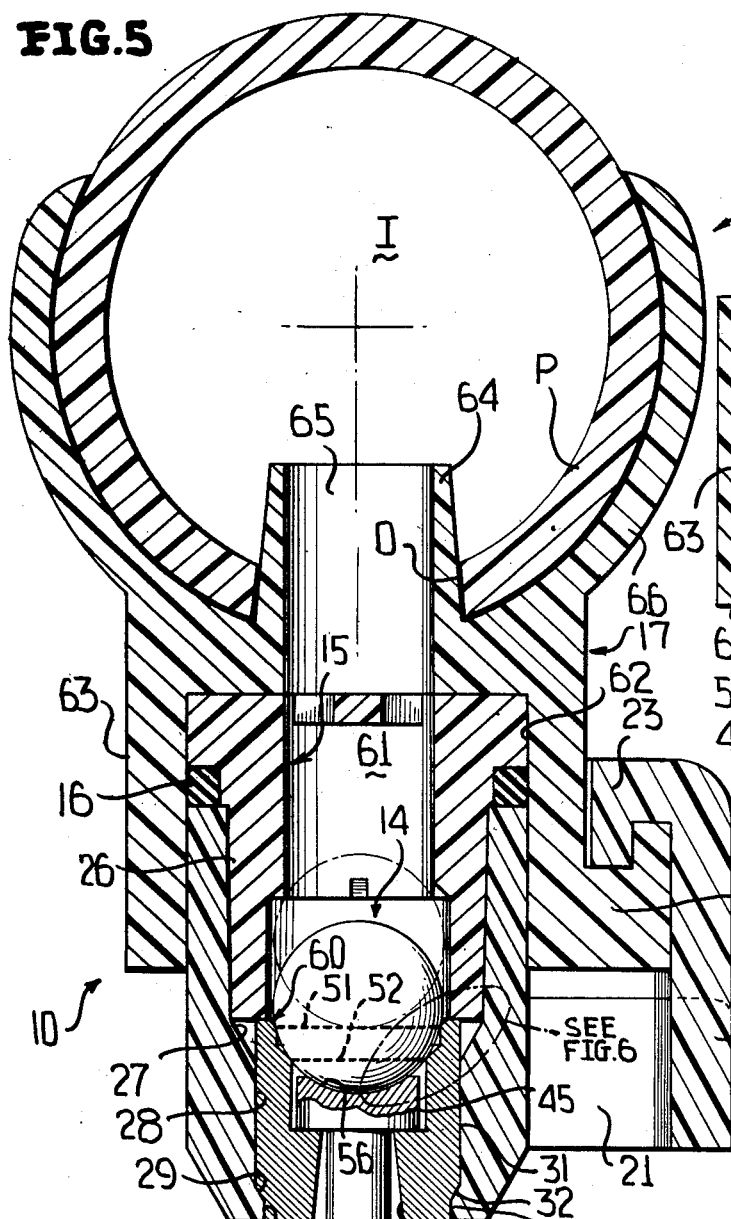
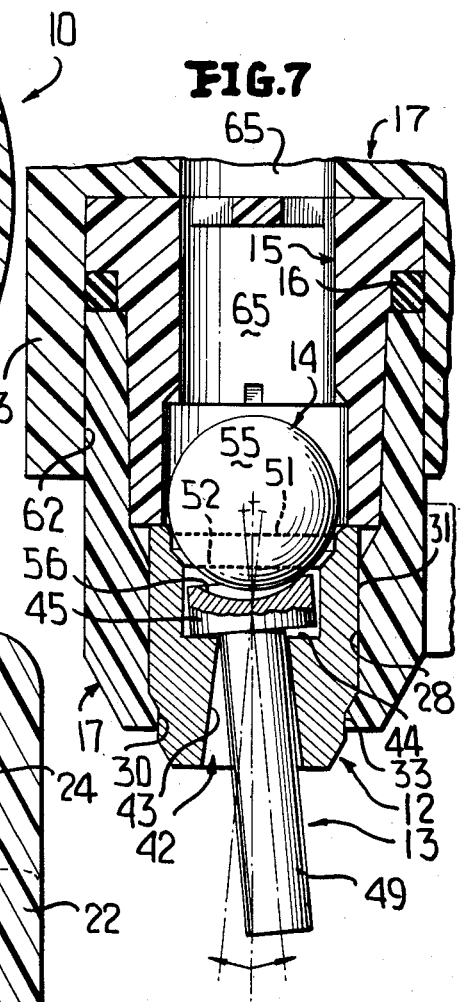
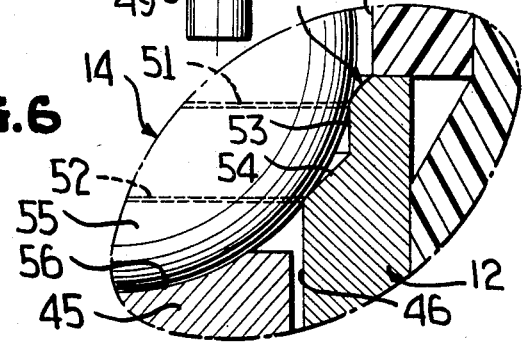
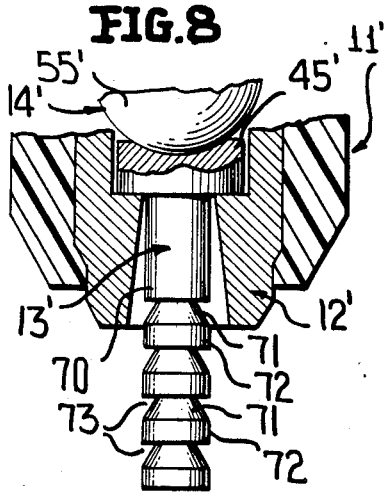

NIPPLE FOR FEEDING LIQUIDS TO FOWL AND/OR SMALL ANIMALS

This application is a continuation of application Ser. No. 595,577, filed Apr. 2, 1984, and now U.S. Pat. No. 4,524,724.

The present invention is directed to an improvement in a nipple particularly adapted for feeding liquid to fowl and/or small animals, and specifically is an improvement over the nipple disclosed in U.S. Pat. No. 4,284,036 in the name of Eldon Hostetler issued on Aug. 18, 1981.

The nipple of the latter-identified patent is disadvantageously formed in part by a flexible pair of rubber seats which deteriorate rapidly under the influence of chlorine, iodine or other chemicals found virtually in all potable water supplies. Such chemicals vary the physical characteristics of the flexible seals resulting in changes which cause erratic operation. For example, apart from pure deterioration of the resilient seats or seals, should the same increase or decrease in flexibility as a result of chemicals in the water, the amount of water released as the ball is unseated will vary from operation to operation. Thus, consistency of performance and longevity are attributes which are simply not possessed by the patented nipple.

The patented nipple also includes a spring for seating the ball upon an actuator pin, and the spring results in a less than compact nipple, not to mention the fact that an additional element (spring) is necessary for desired operability.

Another disadvantage of the patented nipple is the manner in which the ball seats upon a limited portion of the head of the stem or pin which permits a concavity of the head to become partially or completely filled with dirt or similar debris. When the latter occurs, the ball is not as readily triggered through movement of the stem or pin and, just as importantly, the operation of the ball is erratic depending upon the degree of accumulated dirt causing proportionate erratic ball lift and ball lowering. Erratic ball lifting is a major problem, but should the dirt accumulate sufficiently, the ball may not lower to a proper seat creating peripheral leaks along the flexible seal or seals. Such leakage creates a continuous flow of water which passes through associated cages into manure pits therebelow resulting in highly undesired wet manure.

Finally, another disadvantage of the patented nipple is the construction of the valve housing such that a portion thereof projects into the water supply pipe and restricts water flow therethrough. As water flow is restricted the length of the watering pipeline must necessarily be reduced or delivery must be effected from the middle of the line or from both ends, both of which is cumbersome and can be difficult.

In keeping with the foregoing, a primary object of this invention is to provide a novel and unobvious nipple which avoids and overcomes all of the disadvantages latter-noted relative to the patented nipple and does so through a simple and unique nipple structure characterized most notably by a relatively thick-walled metallic machined insert defining a passage through which liquid is adapted to pass from an upstream passage portion to a downstream passage portion thereof, the insert including first and second peripheral valve seats and a metallic ball adapted to be seated thereupon under the influence of gravity/liquid pressure to define respective first and second liquid seals, a stem defined by a head and a pin with the head having a concave surface within which is fully seated a spherical surface of the metallic ball, the pin being positioned for manipulation by fowl and/or small animals to move the head and the metallic ball seated thereon to unseat the same from the first and second peripheral valve seats breaking the respective first and second liquid seals, and means immediately upstream of the most upstream or fist peripheral valve seat for both centering the metallic ball relative to both the first and second peripheral valve seats and for preventing the establishment of high impact closing forces between the metallic ball and the second peripheral valve seat thereby assuring repetitive formation of the first and second seals absent damage to the metallic ball.

Yet another object of this invention is to provide a novel nipple as aforesaid in which the metallic insert includes an exterior surface press-fit within and against an interior surface of an associated housing.

Yet another object of this invention is to provide a novel nipple of the type heretofore described wherein the first and second peripheral valve seats and the centering and impact force preventing means of the insert are all machine surfaces.

A further object of this invention is to provide a novel nipple as heretofore described wherein the first peripheral valve seat is defined by a concavely curved surface, the second peripheral valve seat is also defined by a concavely curved surface, and the centering and preventing means is a smooth curved transition surface defined by a plurality of successive diameters each of which is progressively greater than the diameter of the first peripheral valve seat, as measured in an upstream direction.

With the above and other objects in view that will hereinafter appear, the nature of the invention will be more clearly understood by reference to the following detailed description, the appended claims and the several views illustrated in the accompanying drawings.

IN THE DRAWINGS:

FIG. 1 is a perspective view of a novel nipple constructed in accordance with this invention, and illustrates the nipple connected to a plastic water pipe.

FIG. 2 is an exploded axial sectional view of a portion of the nipple of FIG. 1, and illustrates several components thereof prior to assembly including a plastic housing, a metallic insert defining a flow passage, a stem, a spherical ball, a lid and an O-ring seal.

FIG. 3 is an enlarged fragmentary sectional view of the encircled portion of FIG. 2, and illustrates two peripheral valve seats of the insert of a concave configuration conforming to the exterior surface of the ball.

FIG. 4 is an axial sectional view of a partial assembly of the nipple and illustrates the insert press fit in the lower housing, the stem within a passage of the insert, and the ball seated against and upon both valve seats and fully within a concave surface of a head of the stem.

FIG. 5 is an enlarged sectional view taken generally along line 5—5 of FIG. 1 and illustrates the lid in its operative position and an upper housing secured to the water pipe through a saddle bonded thereto.

FIG. 6 is an enlarged fragmentary sectional view of the encircled area of FIG. 5 and more clearly illustrates the spherical ball fully seated upon its mirror image peripheral valve seats.

FIG. 7 is an axial sectional view of the nipple similar to FIG. 6, but illustrates the stem moved to a position unseating the ball resulting in the flow of liquid through the passage and down the stem to an awaiting fowl or small animal.

FIG. 8 is a fragmentary sectional view of another embodiment of the invention, and illustrates a stem having alternating cylindrical and frusto-conical portions defining annular water-retaining gaps therebetween.

A novel nipple constructed in accordance with this invention is generally designated by the reference numeral 10, and is formed by a lower plastic housing 11, a metallic insert 12, a metallic stem 13, a metallic spherical ball 14, a plastic lid 15, and O-ring seal 16 of rubber or similar material and an upper plastic housing 17.

The lower plastic housing 11 of the nipple 10 includes a pair of radially outwardly directed legs 20, 21 (FIG. 1) spanned by a bight wall 22 to which is integrally formed an inverted J-shape hook 23. The hook 23 cooperates with a radially outwardly and upwardly directed projection 24 (FIGS. 1 and 5) of the upper housing 17 to releasably interlockingly secure the housings 11, 17 to each other as will be described more fully hereinafter.

The lower housing 11 is preferably injection molded and includes a cylindrical surface 26 (FIG. 2) blending with a frusto-conical surface 27 which in turn blends with another cylindrical surface 28, which in turn blends with another frusto-conical surface 29, and the latter blends with a final cylindrical surface 30. The tolerances of the surfaces 28, 30 are such as to form a press-fit with corresponding surfaces of the insert 12 as will be described more fully hereinafter.

The insert 12 is constructed of stainless steel and includes an outer cylindrical surface 31, a frusto-conical shoulder 32, another cylindrical surface 33, and a frusto-conical surface 34. The insert 12 is press-fit into the lower housing 11 bringing the surfaces 31, 33 of the insert 12 into press-fit relationship with the respective surfaces 28, 30 of the lower housing 11 (FIG. 4). Due to the relatively thick walled cross-section of the insert 12, the various machined surfaces and the extremely high tolerances thereof remain unchanged and/or unaffected by the press-fit relationship between the lower housing 11 and the insert 12.

The stainless steel insert 12 is machined both externally and internally, including the surfaces 31 through 34 and the entire interior of the insert 12 defining a flow passage for liquid (water) which is generally designated by the reference numeral 40. The flow passage 40 includes an upstream end portion 41 and a downstream end portion 42, the latter of which is defined by a frusto-conical wall 43 defining an included angle of 7° to the vertical or to the axis of the passage 40. An annular shoulder 44 of the passage 40 forms a seat for a head 45 of the stem 13, as is most readily apparent from FIGS. 4 and 5 of the drawings.

Upstream of the annular shoulder 44 the insert 12 includes a cylindrical surface 46 and first and second peripheral valve seats 51, 52, respectively (FIG. 3). The peripheral valve seat 51 is radially outwardly offset from the peripheral valve seat 52 and valve seats 51, 52 are immediately adjacent a cylindrical surface 53 and a frusto-conical surface 54, respectively. The first and second peripheral valve seats 51, 52 have identical outwardly opening concave surfaces which are mirror images of an exterior surface 55 of the ball 14. Obviously, the diameter of the peripheral valve seat 52 is less than the diameter of the peripheral valve seat 51 and the diameter of the latter is less than the diameter of the ball 14. Hence in the fully seated position of the ball 14 (the solid lines in FIG. 5 and FIG. 6), the surface 55 of the ball 14 seats with exactitude against the concave surfaces 51, 52 and defines therewith first and second peripheral liquid seals (unnumbered). In the same fully seated position of the ball 14 relative to the peripheral valve seats 51, 52, the surface 55 also fully seats within and upon an upwardly opening concave surface 56 (FIGS. 4, 5 and 6) of the head 45. Due to the latter relationship dirt, grime or like contaminants carried by water flowing through an associated pipe P (FIG. 1) and eventually flowing through the passage 40 cannot accumulate upon the concave surface 56 and thus the movement of the ball 14 is repetitively accurate during both opening and closing operations, i.e., unseating of the ball 14 relative to the peripheral valve seats 51, 52 (FIG. 7) and seating thereupon to form the peripheral liquid seals (FIGS. 4, 5 and 6). In the absence of the latter full-seated relationship between the concave surface 56 and the surface 55 debris which might otherwise accumulate therebetween would result in the ball 14 being raised slightly from its normal (closed) position thereby creating a liquid leak at one or more of the peripheral valve seats 51, 52. The accumulation of such dirt or debris also renders erratic the opening operation as the stem 13 is cocked or moved (FIG. 7) by a small animal or fowl. In such cases overwatering might occur due to such accumulated dirt or debri, the disadvantage resulting therefrom resides primarily in the fact that the water simply drips through the associated cages and collects in a manure pit therebelow resulting in highly undesired extremely wet manure. However, the latter is totally obviated by the perfectly matched seating between the surface 55 of the ball 14 and the concave surface 56 of the head 45.

The insert 12 also includes means generally designated by the reference numeral 60 (FIGS. 3 and 6) in the form of a peripherally disposed convex surface located immediately upstream from the first peripheral valve seat 51 which is operative for both centering the metallic ball 14 relative to both the first and second peripheral valves 51, 52, respectively, and for preventing the establishment of high impact closing forces between the metallic ball 14 and both peripheral valve seats 51, 52, but most notably the second peripheral valve seat 52, to assure repetitive formation of the two peripheral seals absent damage to the surface 55 of the metallic ball 14. Stated otherwise, the convex surface 60 progressively increases in diameter in the upstream direction from the peripheral valve seat 51 beginning with a minor diameter less than the diameter of the ball 14 and a major diameter greater than the diameter of the ball 14, as is most readily apparent from FIGS. 5 and 6 of the drawing. During repetitive seating and unseating of the ball 55, the same rarely, if ever, moves perfectly vertically upwardly and downwardly to make total peripheral contact with the valve seats 51, 52. Instead the ball 14 is indiscriminately moved repetitively in a variety of different directions depending upon the manner in which the small animals or fowl actuate the stem 13. However, irrespective of the ball 14 being axially misaligned, as it descends from an unseated position toward the peripheral seats 51, 52, the surface 55 will encounter the convex surface 60 and will not impact against the peripheral valve seat 51. Thus, the surface 55 will not be damaged because of the gradual convex curvature of the surface 60, nor will the surface 55 damage either of the peripheral valve seats 51 or 52. The latter would not occur in the absence of the convex surface 60, as can be readily visualized. Absent the surface 60 the ball 14 in its descent to a closing position would impinge directly against either or both of the surfaces 51, 52 and these, in turn, because of the relatively small size thereof (0.003) would either nick the surface 55 or they themselves become nicked or damaged. In any event if this were cumulative the exacting surfaces 51, 52 and 55 would be nicked, scratched or otherwise abused to such an extent that the lifetime of the nipple 10 would be greatly diminished. However, due to the convex surface 60 and the dimensional relationships (diameters) thereof to the diameter of the ball 14 and the lesser diameters of the peripheral valve seat 51, 52, such impact force defects are totally eliminated and the lifetime of the operability of the nipple 10 is tremendously increased absent any type of leakage whatever.

Once the insert 12 has been pressed into the lower housing 11 (FIG. 4) and the stem 13 and ball 14 have been positioned therein, as shown in FIG. 4, the lid 15 (FIG. 2) is preassembled by inserting thereupon the O-ring gasket 16 and then simply press-fitting an exterior surface 59 of lid 15 into intimate conformity and gripping engagement with the cylindrical surface 26 of the lower housing 11 resulting in a slight compression of the gasket 16, as is best shown in FIG. 5. The lid 15 includes a passage 61 therethrough, but due to the absence of a spring, as in the patented nipple heretofore described, the axial length of lid 15 is appreciably shorter than the same structure in the patented nipple. This results in an overall axially compact nipple which allows the stem to be located higher in an associated cage than the patented nipple so that the animal or fowl which is watering will peck at or otherwise move the stem 13 from a downward to an upward angle of attack, as opposed to a more perpendicular angle of attack resulting in less water spillage and corresponding less wet manure. In addition, the more compact, squatter, or lesser axial length of the insert 12 permits the same to be housed within a cylindrical bore 62 of a tubular projection 63 of the upper housing 17 wholly exterior of the pipe P and an opening O thereof. Due to the latter, the upper housing 17 is provided with a relatively small diameter tube or tubular portion 64 having a passage 65 therethrough which places an interior I of the pipe P in fluid communication with the passage 61 of the lid 15. However, since the tubular portion 64 is of a small diameter, it permits maximum water flow along the length of the pipe P which, of course, has numerous ones of the nipples 10 secured thereto by bonding associated saddles 66 to the exterior of the pipe P. Because of the small diameter of the tubular portion 64, maximum water flow through the pipe P can be established as, for example, feeding water through a pipe P from one end for a length of 600 feet in accordance with the present invention, whereas the patented nipple can only feed water in a line 280 feet long, but even at that the same must be fed from the middle or both ends.

In operation water flows through the pipe P and the bores or passages 65, 61 (FIG. 5). With the ball 14 seated (solid lines in FIGS. 5 and 6) flow through the passage 40 of the insert 12 is precluded because of the two liquid seals formed between the surface 55 of the ball 14 and the concave peripheral valve seats 51, 52 (FIG. 6). The ball 14 is thus held in this seated relationship due to its own weight (gravity) and low pressure of the water upstream thereof. At any such time as the exposed end (unnumbered) of the stem 13 is moved, lifted, tilted, etc. by fowl or small animals, the ball 14 is in turn removed at least partially from the seats 51, 52, as is graphically illustrated in FIG. 7, at which time water descends along a pin 49 of the stem 13 and can be received by the feeding animal. Once the latter (stem 13) is released, the weight of the ball 14 and the water pressure again reseats the ball 14 upon the peripheral concave valve seats 51, 52. As was heretofore described, at any such time that the ball 14 is off-center to the axis of the passage, the convex surface 60 prevents impact forces of the ball 14 from damaging particularly the peripheral valve seat 52, but also the valve seat 51 and, of course, the surface 55 of the ball 14 itself.

Reference is made to FIG. 8 of the drawings in which another embodiment of the invention is illustrated with like elements being identically numbered through primed. Thus the nipple 10' of FIG. 8 includes a lower housing 11' an insert 12' and a spherical metallic ball 14'. However, in this case a stem 13' has an identical head 14' and concave surface 56', but a pin 70 thereof is defined by alternating frusto-conical surfaces 71 and cylindrical surfaces 72 defining therebetween annular liquid/water retaining gaps 73. Capillary attraction retains water within the gaps 73 and thus during any particular dispensing operation appreciably more water will be retained upon the pin 70 due to the grooves 73 than upon the perfectly cylindrical pin 49 of the stem 13. Otherwise the nipple 10' is identical in function and operation to the nipple 10.

What is claimed is:

1. A nipple particularly adapted for feeding liquid to fowl and/or small animals comprising a housing, a rigid metallic insert in said housing, means for defining a passage through said metallic insert through which liquid is adapted to pass from an upstream passage portion to a downstream passage portion, valve means in said passage for controlling the flow of liquid therethrough, said valve means including a metallic spherical ball of a predetermined diameter and first and second peripheral valve seats within said upstream passage portion, said first peripheral valve seat being upstream from said second peripheral valve seat, said first peripheral valve seat having a diameter less than said ball predetermined diameter but greater than the diameter of said second peripheral valve seat, said metallic ball being seated under the influence of gravity/liquid pressure upon each of said first and second peripheral valve seats in a closed position of said valve means and defining therewith respective first and second liquid seals, a stem disposed in part within said passage, said stem having an interior end portion adjacent said metallic ball and an exterior end portion projecting outwardly of said downstream passage portion whereby fowl and/or small animals can manipulate said stem to move said metallic ball and unseat the same from said first and second peripheral valve seats breaking said respective first and second liquid seals and effecting liquid flow through said passage means, said metallic insert includes an exterior surface in press-fit relationship to an interior surface of said housing, said metallic insert has a relatively thick cross-section, said housing interior surface being defined by first and second cylindrical surfaces and an annular surface therebetween, said first cylindrical surface being upstream from and of a greater diameter than said second cylindrical surface whereby said annular surface defines a shoulder, said metallic insert includes corresponding first and second exterior surfaces and an exterior annular surface in intimate engagement with said housing first and second cylindrical surfaces and said housing annular surface respectively, said metallic insert has a downstream end projecting beyond a downstream portion of said housing and said shoulder, an upstream portion of said housing being removably connected to said downstream housing portion, and said upstream housing portion having a downstream edge axially opposing said housing shoulder whereby a major portion of the length of said metallic insert is confined between said shoulder and downstream edge.

* * * * *